United States Patent
Ozawa

(10) Patent No.: US 8,439,507 B2
(45) Date of Patent: May 14, 2013

(54) PROJECTOR WITH ON SCREEN DISPLAY ADJUSTMENT AND CONTROL METHOD THEREOF

(75) Inventor: Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 12/978,992

(22) Filed: Dec. 27, 2010

(65) Prior Publication Data

US 2011/0170021 A1    Jul. 14, 2011

(30) Foreign Application Priority Data

Jan. 9, 2010 (JP) ................ 2010-003451

(51) Int. Cl.
*G03B 21/14* (2006.01)
*H04N 9/31* (2006.01)
*G02B 15/14* (2006.01)

(52) U.S. Cl.
USPC ........ 353/101; 353/69; 348/744; 348/240.99; 359/676

(58) Field of Classification Search .................. 353/101, 353/69; 348/744, 240.99; 359/676
See application file for complete search history.

(56) References Cited

U.S. PATENT DOCUMENTS

| 7,384,157 B2 | 6/2008 | Muraoka et al. |
| 2008/0284987 A1* | 11/2008 | Yonezawa ...................... 353/70 |
| 2011/0025982 A1* | 2/2011 | Takahashi ...................... 353/15 |

FOREIGN PATENT DOCUMENTS

| CN | 1641472 A | 7/2005 |
| JP | A-2002-112137 | 4/2002 |
| JP | A-2003-333449 | 11/2003 |
| JP | A-2006-109148 | 4/2006 |
| WO | WO 2009/071481 A1 | 6/2009 |

\* cited by examiner

*Primary Examiner* — Georgia Y Epps
*Assistant Examiner* — Magda Cruz
(74) *Attorney, Agent, or Firm* — Oliff & Berridge, PLC

(57) ABSTRACT

A projector includes: an OSD processing section that generates a synthesized image formed by synthesizing an OSD image on a main image; an image projecting section that projects and displays the synthesized image; a zoom adjusting section that adjusts a zoom state of the image projecting section; and a zoom state detecting section that detects the zoom state that is adjusted by the zoom adjusting section, wherein the OSD processing section adjusts a size of the OSD image with respect to the main image based on the detection result of the zoom state detecting section.

6 Claims, 8 Drawing Sheets

WIDE END

TELE END

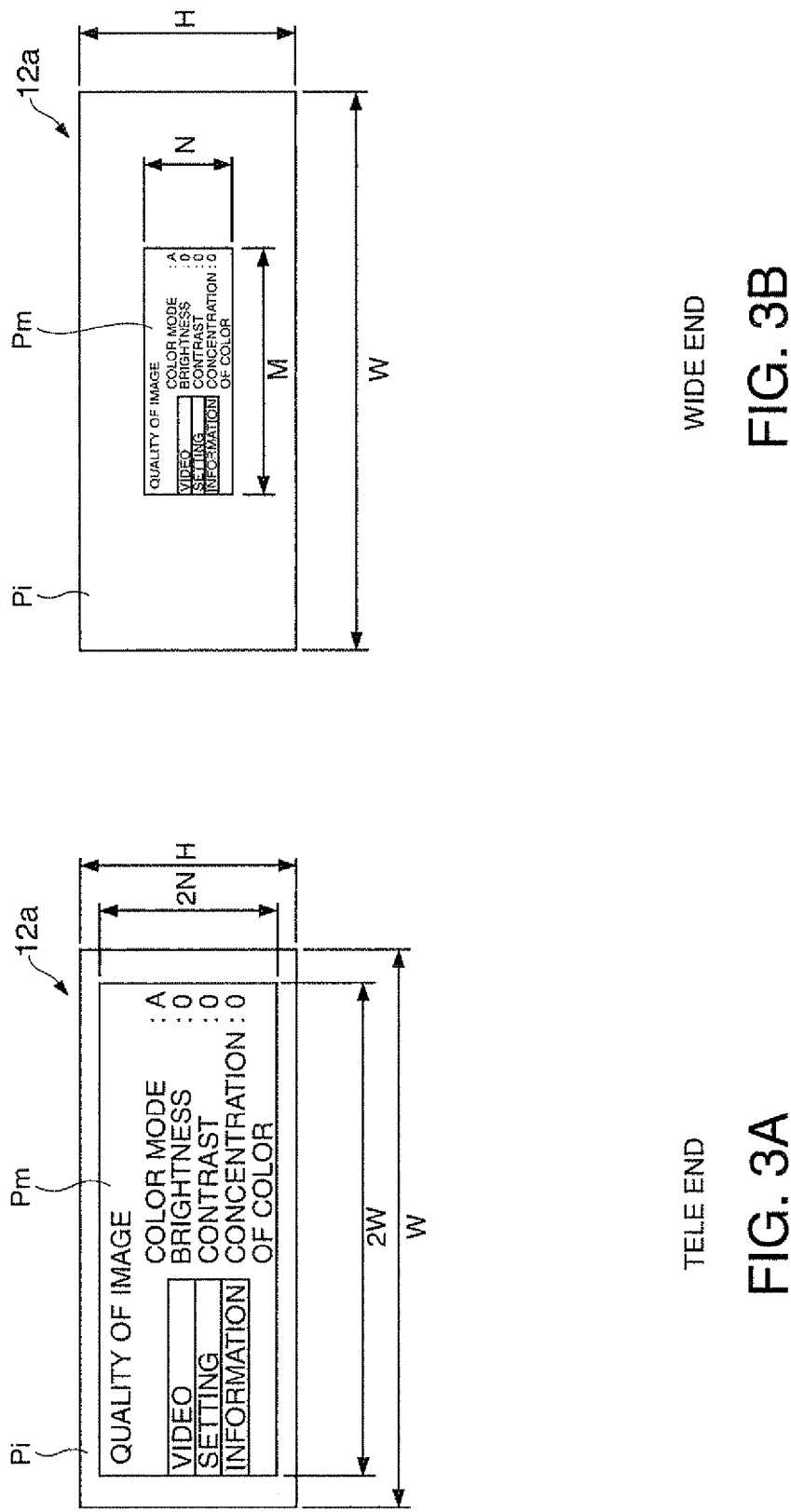
FIG. 3B WIDE END
FIG. 3A TELE END

WIDE END

TELE END

PROJECTOR WITH ON SCREEN DISPLAY ADJUSTMENT AND CONTROL METHOD THEREOF

CROSS-REFERENCE

The present application claims priority from Japanese Patent Application No. 2010-003451 filed on Jan. 9, 2010, which is hereby incorporated by reference in its entirety.

BACKGROUND

In most of projectors which modulate a light emitted from a light source to form an image and projects the image onto a screen or the like to display the image, an OSD (On Screen Display) image such as a menu image, a message image or the like is synthesized and projected onto a principal image (a main image). In Japanese Patent Publication No. 2003-333449, a technique in which a size of letter that is included in the OSD image is changeable is suggested and if the technique is applied, a user can easily see the letter that is included in the OSD image and the letter may be displayed at a suitable size that does not cause a sense of discomfort.

However, in a case where the projector has a zoom adjustment function so as to adjust the size (the display size) of the image that is displayed on the screen or the like, when the display size of the main image is adjusted by the zoom adjustment function, the display size of the OSD image is also changed (enlarged or reduced) together with the main image, such that there is a problem that the OSD image is difficult to see.

SUMMARY

Various embodiments may solve at least a part of the problems described above, and the embodiments can be implemented as the following aspects or application examples.

APPLICATION EXAMPLE 1

According to at least one embodiment of the disclosure, there is provided a projector including an OSD processing section configured to generate a synthesized image formed by synthesizing an OSD image on a main image, an image projecting section configured to project the synthesized image, a zoom adjusting section configured to adjust a zoom state of the image projecting section, and a zoom state detecting section configured to detect the zoom state that is adjusted by the zoom adjusting section, in which the OSD processing section adjusts a size of the OSD image with respect to the main image based on the detection result of the zoom state detecting section.

According to this projector, the zoom state detecting section detects the zoom state and the OSD processing section adjusts the size of the OSD image with respect to the main image based on the detection result, so that the change of the display size of the OSD image according to the adjustment of the zoom state can be suppressed.

APPLICATION EXAMPLE 2

The OSD processing section may enlarge the size of the OSD image with respect to the main image in a case where the zoom state is changed from the wide side to the tele side and may reduce the size of the OSD image with respect to the main image in a case where the zoom state is changed from the tele side to the wide side.

According to this projector, in a case where the zoom state is changed from the wide side to the tele side, in other words, if the display size of the main image is reduced, the OSD processing section enlarges the size of the OSD image with respect to the main image, in a case where the zoom state is changed from the tele side to the wide side, in other words, if the display size of the main image is enlarged, the OSD processing section reduces the size of the OSD image with respect to the main image. Thus, the change of display size of the OSD image according to the adjustment of the zoom state can be suppressed.

APPLICATION EXAMPLE 3

The OSD processing section may adjust the size of the OSD image with respect to the main image so that the projected OSD image is displayed constantly in spite of the zoom state.

According to this projector, even in a case where the zoom state is adjusted, the OSD image is displayed at the constant size, so that lowering of the visibility of the OSD image may be suppressed.

APPLICATION EXAMPLE 4

According to at least one embodiment of the disclosure, there is provided a method of controlling a projector including an OSD processing section configured to generate a synthesized image formed by synthesizing an OSD image on a main image, an image projecting section configured to project the synthesized image, and a zoom adjusting section configured to adjust a zoom state of the image projecting section, the method including: detecting a zoom state that is adjusted by the zoom adjusting section: and adjusting a size of the OSD image with respect to the main image based on the detection result in the detecting of a zoom state in detecting.

According to this method, the zoom state is detected in the zoom state detecting of a zoom state and the size of the OSD image with respect to the main image is adjusted based on the detection result adjusting of a size so that the change of the display size of the OSD image according to the adjustment of the zoom state may be suppressed.

APPLICATION EXAMPLE 5

In the adjusting of a size, the size of the OSD image with respect to the main image may be enlarged in a case where the zoom state is changed from a wide side to a tele side, and the size of the OSD image with respect to the main image may be reduced in a case where the zoom state is changed from a tele side to a wide side.

According to this method, in the adjusting of a size, the size of the OSD image with respect to the main image is enlarged in a case where the zoom state is changed from a wide side to a tele side, in other words, the display size of the main image is reduced, and the size of the OSD image with respect to the main image is reduced in a case where the zoom state is changed from a tele side to a wide side, in other words, the display size of the main image is enlarged. Thus, the change of the display size of the OSD image according to the adjustment of the zoom state may be suppressed.

APPLICATION EXAMPLE 6

In the adjusting step, a size of the OSD image with respect to the main image may be adjusted so that the projected OSD image is displayed constantly in spite of the zoom state.

According to this method, even in a case where the zoom state is adjusted, the OSD image is maintained in a constant size so that the lowering of the visibility of the OSD image may be suppressed.

Furthermore, in a case where the projector and the method thereof are established by using a computer that is provided at the projector, the above-described application examples may also be configured of a program for realizing the function, a recording medium in which the program is stored as a computer readable program or the like. As the recording medium, various computer readable media such as a flexible disc, a hard disk, an optical disc such as a CD or a DVD, an optical magnetic disk, a memory card or a USB memory on which a nonvolatile semiconductor memory is loaded, an internal storage device (a semiconductor memory such as a RAM or a ROM) of the projector may be used.

BRIEF DESCRIPTION OF THE DRAWINGS

Non-limiting and non-exhaustive embodiments of the present disclosure will be described with reference to the accompanying drawings, wherein like reference numbers reference like elements.

FIG. 3A is a front side view illustrating a pixel region of a liquid crystal light bulb and a zoom state is a tele end, and FIG. 3B is a front side view illustrating a pixel region of a liquid crystal light bulb and the zoom state is a wide end.

DESCRIPTION OF EMBODIMENTS

First Embodiment

Hereinafter, the projector of the first embodiment will be described with reference to drawings.

The projector of the embodiment is an optical device in which the projector modulates a light that is output from the light source, forms an image (hereinafter, referred to as "an input image") based on image information that is input from the outside, and projects the image onto a surface (hereinafter, referred to as "a projection surface") of a screen, wall surface or the like.

Figure 1:
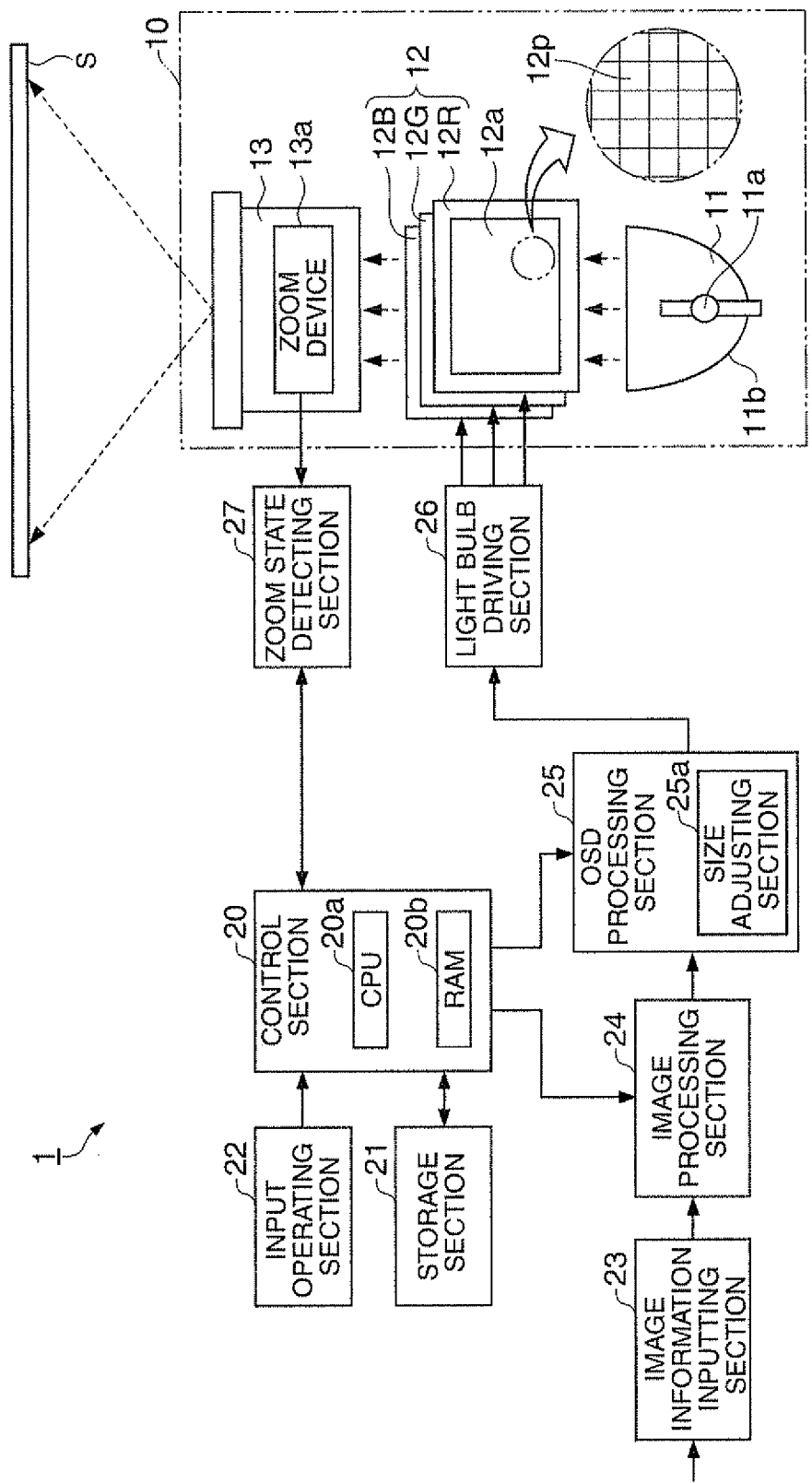
FIG. 1 is a block diagram schematically illustrating a configuration of a projector.
Figure 2B:
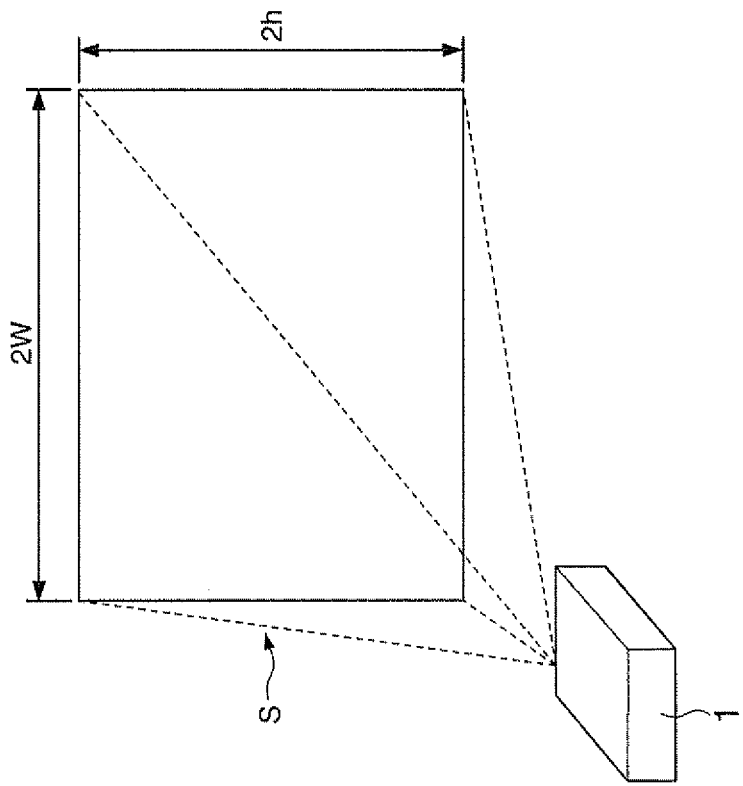
FIG. 2B is a perspective view illustrating the projector in a state in which an image is projected onto the projection plane, and the zoom state is a wide end.
Figure 2A:
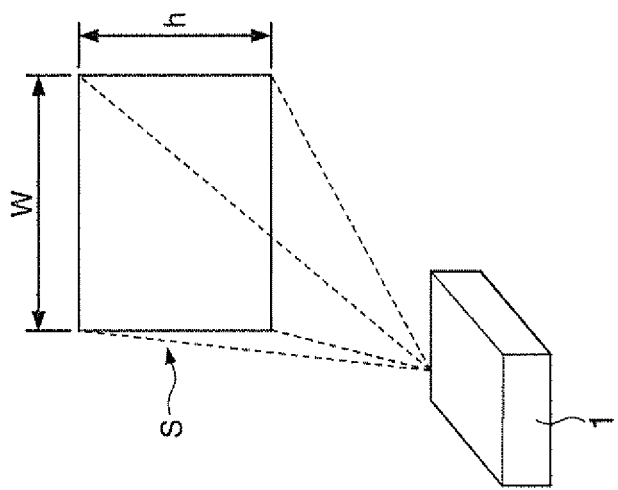
FIG. 2A is a perspective view illustrating the projector in a state in which an image is projected onto the projection plane, and a zoom state is a tele end.

FIG. 1 is a block diagram schematically illustrating a configuration of projector of the embodiment. FIGS. 2A and 2B are perspective views illustrating the projector in a state in which an image is projected onto the projection surface. As shown in FIG. 1, a projector 1 includes an image projecting section 10, a control section 20, a storage section 21, an input operating section 22, an image information inputting section 23, an image processing section 24, an OSD processing section 25, a light bulb driving section 26, a zoom state detecting section 27 or the like.

The image projecting section 10 is configured of a light source 11, three liquid crystal light bulbs 12 (12R, 12G and 12B) as a light modulation apparatus, a projecting lens 13 as a projection optical system or the like. The image projecting section 10 corresponds to a display section, modulates the light that is output from the light source 11 using the liquid crystal light bulb 12 so as to form the image (image light), magnifies and projects the image from the projecting lens 13, and then displays it onto a projection surface S.

The light source 11 includes a discharge type light source lamp 11a such as an ultra high pressure mercury lamp, a metal halide lamp or the like and a reflector 11b that reflects the light which is emitted by the light source lamp 11a in a substantially constant direction. The light that is output from the light source 11 is converted into a light of which luminance distributions are substantially constant by a integrated optical system (not shown), and after separated into color light components of the three primary colors; red (R), green (G) and blue (B) by a color separation optical system (not shown), and incident to liquid crystal light bulbs 12R, 12G and 123 respectively.

The liquid crystal light bulb 12 has a liquid crystal panel or the like in which the liquid crystal is sealed in-between a pair of transparent substrates. In the liquid crystal light bulb 12, a rectangular shaped pixel region 12a that consists of a plurality of pixels 12p that is arranged in a matrix shape is formed and a driving voltage may be applied to each of the pixels 12p with respect to the liquid crystal. When the light bulb driving section 26 applies the driving voltage to each of the pixels 12p according to the image information that is input, each of the pixels 12p is set to be an optical transmittance according to the image information. Thus, the light that output from the light source 11 is transmitted to the pixel region 12a of the liquid crystal light bulb 12 and then modulated so that the image is formed in each of color lights according to the image information.

The formed image of each of the colors is magnified and projected onto the projection surface S by the projecting lens 13 after each image is synthesized by the pixel 12p by a color synthesizing optical system (not shown) and becomes a color image. The projecting lens 13 includes a plurality of lens group (not shown) within a cylindrical shape barrel. The projecting lens 13 is a zoom lens and includes a zoom device 13a that adjusts the zoom state by changing a relative position in the direction of an optical axis of each of lens groups. The user can adjust an enlargement rate of the image by the zoom device 13a, in other words, the size of the image (hereinafter referred to as "display size") that is displayed onto the projection surface S.

As shown in FIGS. 2A and 2B, in the embodiment, in a case where the zoom state of the projecting lens 13 is at the maximum wide angle side (the wide end), the display size is doubled compared to a case of being the maximum telescopic side (the tele end) In other words, when the display size of the image that is displayed on the projection surface S is w×h in a case where the zoom state is the tele end and the image is projected, and the display size of the image is doubled (2w× 2h) both perpendicularly and horizontally in a case where the zoom state is the wide end and the image is projected onto the same projection surface S.

Returning to FIG. 1, the control section 20 includes a CPU (Central Processing Unit) 20a, a RAM (Random Access Memory) 20b that is used to temporally store various types of data or the like, and operates according to the control program that is stored in the storage section 21 so that the control section 20 collectively controls the operation of the projector 1. In other words, the control section 20 functions as the computer with the storage section 21.

The storage section 21 is configured of a nonvolatile memory such as a mask ROM (Read Only Memory) or, a flash memory, FeRAM (Ferroelectric RAM: ferroelectrics memory). The storage section 21 stores a control program that controls a operation of the projector 1 or all types of data that defines a operation conditions or the like of the projector 1.

The input operating section 22 receives an input operation from the user and includes a plurality of operation keys so that the user performs various instructions with respect to the projector 1. The operation keys that are included in the input operating section 22 are a power-supply key to convert the ONOFF performance of the power-supply, a menu key that displays the menu image to perform various settings, a determination key that determines an article selected at the menu image or the like, four direction keys corresponding to up, down, left and right, a cancel key to instruct cancellation of the operation or the like. When the user operates of the various keys of the input operating section 22, the operation signal is output to the control section 20 according to the operation content by the user. As the input operating section 22, the remote controller (not shown) that can remotely control may be used. In this case, the remote controller outputs the operation signal of infrared light according to the operation content by the user and a remote controller signal receiving section (not shown) receives the signal and transports the signal to the control section 20.

The image information inputting section 23 includes a connection terminal (not shown) to perform a connection to the outside image output apparatus (not shown) and in which various types of image information (image signal) is input from the image output apparatus. The image information inputting section 23 outputs the input image information to the image processing section 24.

The image processing section 24 converts various types of image information that is input from the image information inputting section 23 into image information that indicates the gradation of each of the pixels 12p of the liquid crystal light bulbs 12R, 12G and 12B. The converted image information is separated into color lights of R, G and B, and configured of a plurality of pixel values corresponding to the entire pixels 12p of each of the liquid crystal light bulbs 12R, 12G and 12B. The pixel value is to determine the light transmittance of the pixels 12p and the intensity of the gradation of the light that is output from each of the pixels 12p is defined by the image value. Furthermore, the image processing section 24 performs an image quality adjusting process or the like to adjust brightness, contrast, sharpness, shade or the like with respect to the converted image information, and the image information after being processed is output to the OSD processing section 25.

The OSD processing section 25 performs a process to overlap (synthesize) an OSD (on screen display) image such as the menu image or a message image on the input image based on the instruction of the control section 20. The OSD processing section 25 includes an OSD memory (not shown) and stores image data that indicates a figure, font or the like that forms the OSD image. When the control section 20 instructs the overlap of the OSD image, the OSD processing section 25 reads necessary image data from the OSD memory and generates the OSD image information for forming the OSD image that is designated.

Furthermore, the OSD processing section 25 includes a size adjusting section 25a that adjusts the size of the OSD image and can perform a size adjusting process with respect to the generated OSD image information. Specifically, the size adjusting section 25a can enlarge or reduce the size of the OSD image with respect to the input image with a magnification (hereinafter, also referred to as "adjusting magnification") based on the instruction of the control section 20. In other words, when the control section 20 sets the adjusting magnification, the OSD processing section 25 generates the OSD image (the OSD image information) with the size according to the adjusting magnification. After that, the OSD processing section 25 synthesizes the OSD image information that has already been processed, with the image information that is input from the image processing section 24 so as to overlap the OSD image to the predetermined position on the input image. The image information in which the OSD image information at the OSD processing section 25 is synthesized is output to the light bulb driving section 26. Furthermore, the image information that is input from the image processing section 24 is output to the light bulb driving section 26 as it is, when the control section 20 does not instruct the OSD processing section 25 to overlap the OSD image.

The light bulb driving section 26 drives the liquid crystal light bulbs 12 according to the image information that is input from the OSD processing section 25 and forms the image according to the image information to pixel region 12a. Thus, the image is projected from the projecting lens 13 based on the image information and the image is displayed on the projection surface S. In other words, in a case where the OSD processing section 25 overlaps the OSD image, the synthesis image that synthesizes the OSD image on the input image is projected onto the projection surface S and in a case where the OSD processing section 25 does not overlap the OSD image, only the input image is projected onto the projection surface S.

The zoom state detecting section 27 detects the zoom state of the projecting lens 13 based on the instruction of the control section 20 and outputs the detection signal that indicates the detection result to the control section 20. As the zoom state detecting section 27, a detection unit such as a rotary encoder or potentiometer that detects a rotation amount of a rotation cam device (not shown) that moves the lens (the lens group) may be used. Furthermore, if the adjustment of the zoom state is not a manual type that rotationally operates a zoom ring but a electric type that drives the adjustment at a driving apparatus such as a stepping motor according to a button operation, the zoom state may be in a detection state, for example based on the number of steps of the stepping motor.

Next, the operation of the projector 1 will be described.

The projector 1 of the embodiment detects the zoom state of the projecting lens 13 when the OSD image such as the menu image is displayed and displays the OSD image in the display size according to the zoom state. Specifically, even in a case where the zoom state is adjusted by the user and the display size of the input image is changed, the projector 1 controls the display size of the OSD image such that it is not changed.

Figure 4B:
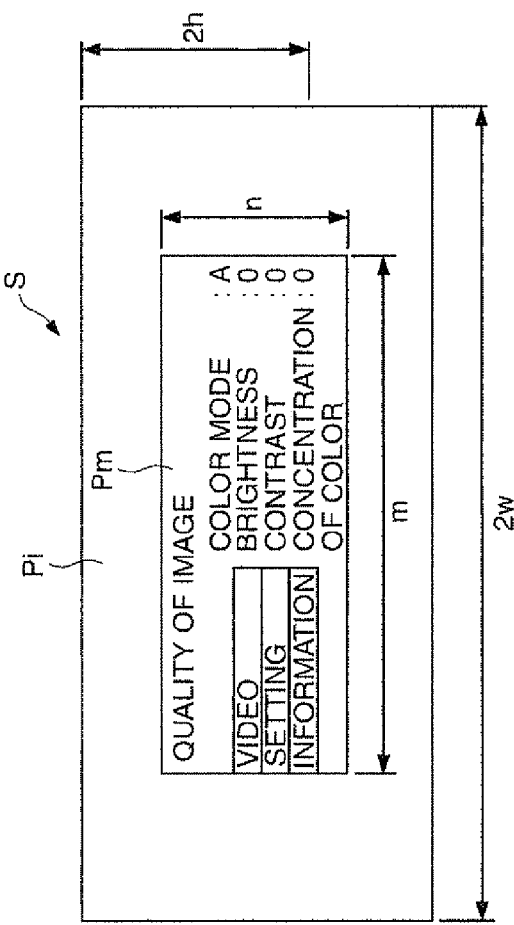
FIG. 4B is a front side view illustrating an image that is projected (displayed) onto the projection plane, and the zoom state is a wide end.
Figure 4A:
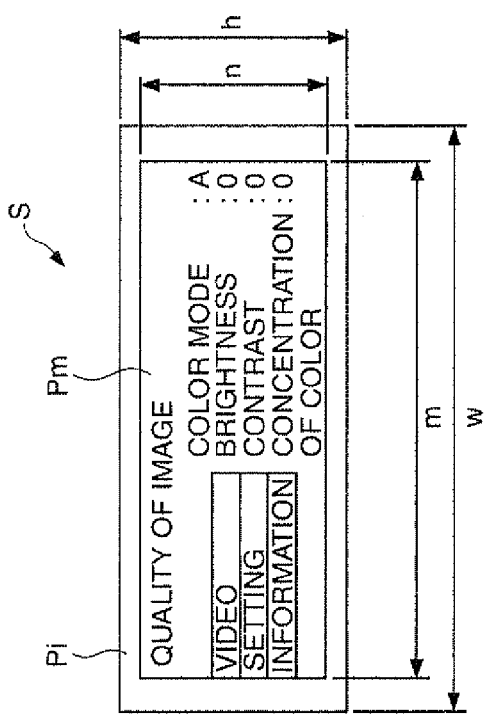
FIG. 4A is a front side view illustrating an image that is projected (displayed) onto the projection plane, and a zoom state is a tele end.

FIGS. 3A and 38 are views illustrating the operation of the projector 1. FIGS. 3A and 3B are front views illustrating a pixel region 12a of a liquid crystal light bulb 12. FIGS. 4A and 48 are views illustrating the operation of the projector 1. FIGS. 4A and 48 are front views illustrating a image that is projected (displayed) onto the projection plane S. In these drawings, FIGS. 3A and 4A are front side views in a case where the zoom state is the tele end, and FIGS. 3B and 48 are front side views in a case where the zoom state is wide end.

As described above, when the menu key of the input operating section 22 is operated, the control section 20 instructs the OSD processing section 25 so that the menu image Pm that is one of the OSD images is overlapped onto the input image Pi. As illustrated in FIGS. 3A to 4B, the menu image Pm is an OSD image for which the user performs various settings and has a configuration including letter columns (article name or the like) in the rectangular figures.

As shown in FIG. 3B, if the zoom state is a wide end, the control section 20 generates the menu image Pm as an M×N size in the OSD processing section 25 and sets the adjustment magnification as 1 so as to adjust the size of the menu image Pm. In other words, the OSD processing section 25 overlays the menu image Pm size as the M×N size as it is with respect to the input image Pi that is formed at pixel region 12a of the W×H size (the number of pixel). As shown in FIG. 4B, when these images are projected from the projecting lens 13, the menu image Pm is displayed in the m×n display size on the projection surface S.

Furthermore, as described above, in a case where the zoom state is the tele end, the display size of the image that is displayed on the projection surface S becomes ½ of the case of the wide end. Thus, as shown in FIG. 3A, in a case where the zoom state is the tele end, the control section 20 sets the adjustment magnification to two so that the size of the menu image Pm with respect to the input image Pi is two times the case in which the zoom state is the wide end. In other words, the OSD processing section 25 generates the menu image Pm of the 2M×2N size and the OSD processing section 25 overlaps to the input image Pi. As the result, as shown in FIG. 4A, the display size of the menu image Pm that is displayed on the projection surface S becomes the same display size (m×n) as in the wide end.

In a case where the zoom state is between the wide end and the tele end, the control section 20 sets the adjustment magnification to an appropriate value between 1 and 2 so that the display size of the menu image Pm becomes m×n. In other words, if the zoom state is changed from the wide side to the tele side, the control section 20 enlarges the adjustment magnification, and if the zoom state is changed from the tele side to the wide side, the control section 20 reduces the adjustment magnification. Thus, the size adjusting section 25a adjusts the size of the menu image Pm with respect to the input image Pi based on the adjustment magnification that is set by the control section 20. In other words, the size adjusting section 25a enlarges the size of the menu image Pm with respect to the input image Pi if the zoom state is changed from the wide side to the tele side and the size adjusting section 25a reduces the size of the menu image Pm with respect to the input image Pi if the zoom state is changed from the tele side to the wide side.

The above-described operation is described using a flowchart.

Figure 5:
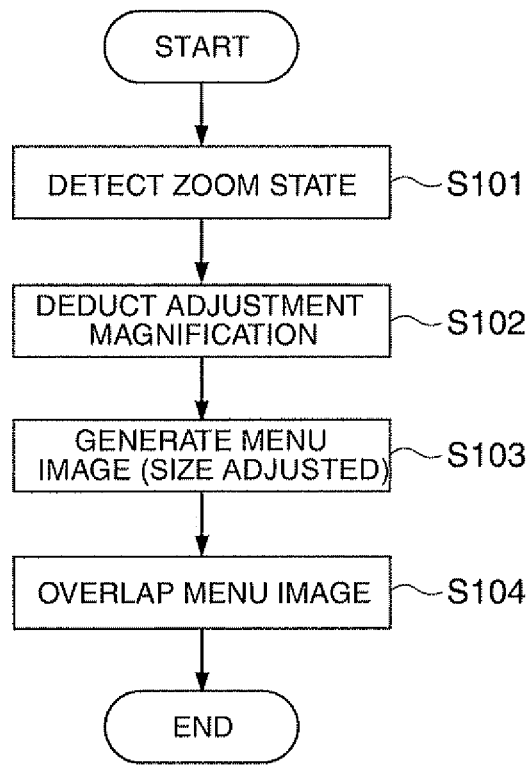
FIG. 5 is a flowchart illustrating the operation of the projector in a case where a menu key is operated according to a first embodiment.

FIG. 5 is a flowchart illustrating an operation of the projector 1 in a case where a menu key is operated. When the user operates the menu key of the input operating section 22, the control section 20 of the projector 1 operates according to the flow.

As shown in FIG. 5, in step S101, the control section 20 gives an instruction to the zoom state detecting section 27 to detect the zoom state of the projecting lens 13.

In step S102, the control section 20 derives the adjustment magnification to standardize the display size of the menu image Pm based on the detection result of the zoom state detecting section 27. For example, in a case where the zoom state is the wide end, the adjustment magnification is 1 and in a case where the zoom state is the tele end, the adjustment magnification is 2. In a case where the zoom state is between the wide end and the tele end, the adjustment magnification is between 1 and 2, and the deduction method may use various methods. For example, a calculation formula that calculates the adjustment magnification from the zoom state is prepared beforehand, and the adjustment magnification may be calculated based on the calculation formula. Furthermore, the adjustment magnification may be derived by a proportional interpolation based on the detected zoom state and a corresponding table in which the zoom state corresponds to the adjustment magnification is prepared beforehand, so that the adjustment magnification corresponding to the detected zoom state may be derived from the corresponding table.

In step S103, the control section 20 outputs the derived adjustment magnification to the OSD processing section 25 and gives an instruction to the OSD processing section 25 to generate the menu image Pm as the size that corresponds to the adjustment magnification. According to the instruction, after the menu image Pm of M×N size is generated, the OSD processing section 25 performs the size adjustment process at the size adjusting section 25a according to the adjustment magnification that is input from the control section 20.

In step S104, the control section 20 gives an instruction to the OSD processing section 25 to overlap the menu image Pm in which the size adjustment is already performed, to the input image Pi and finishes the flow. As a result, the synthesized image in other words, the input image Pi on which the menu image Pm is in an overlapped state is displayed on the projection surface S. Thus, the menu image Pm is displayed at a constant display size regardless of the zoom state of the projecting lens 13.

As described above, according to the projector 1 of the embodiment, effects may be obtained as described below.

(1) According to the projector 1 of the embodiment, when the OSD processing section 25 generates the menu image Pm that is overlapped on the input image Pi, the size adjusting section 25a of the OSD processing section 25 adjusts the size of the menu image Pm with respect to the input image Pi based on the zoom state that is detected at the zoom state detecting section 27. Thus, the change of display size of the menu image Pm according to the adjustment of the zoom state can be controlled.

(2) According to the projector 1 of the embodiment, in a case where the zoom state is changed from the wide side to the tele side, in other words, if the display size of the input image Pi is reduced, the size adjusting section 25a of the OSD processing section 25 enlarges the size of the menu image Pm with respect to the input image Pi, and in a case where the zoom state is changed from the tele side to the wide side, in other words, if the display size of the input image Pi is enlarged, the size adjusting section 25a of the OSD processing section 25 reduces the size of the menu image Pm with respect to the input image Pi. Thus, the change of display size of the menu image Pm according to the adjustment of the zoom state can be controlled.

(3) According to the projector 1 of the embodiment, the control section 20 derives the adjustment magnification so as to display the menu image Pm at a constant display size even after the zoom state is adjusted and the size adjusting section 25a adjusts the size of the menu image Pm with respect to the input image Pi based on the adjustment magnification. In other words, even though the zoom state is adjusted, since the menu image Pm is always displayed at a constant display size, lowering of the visibility of the menu image Pm may be suppressed.

Second Embodiment

Hereinafter, the projector of the second embodiment will be described with reference to drawings.

In the projector 1 of the embodiment, the zoom state detecting section 27 always monitors the zoom state of the projecting lens 13, and in a case where the zoom state is changed, the adjustment magnification is derived so that the display size of the OSD image is constant and the OSD image is reserved in the RAM 20b. Thus, when the OSD image is overlapped, the adjustment magnification is read from the RAM 20b and the OSD image is generated in a size according to the adjustment magnification.

Configuration and operation except the above description are the same as in the first embodiment.

Figure 6:
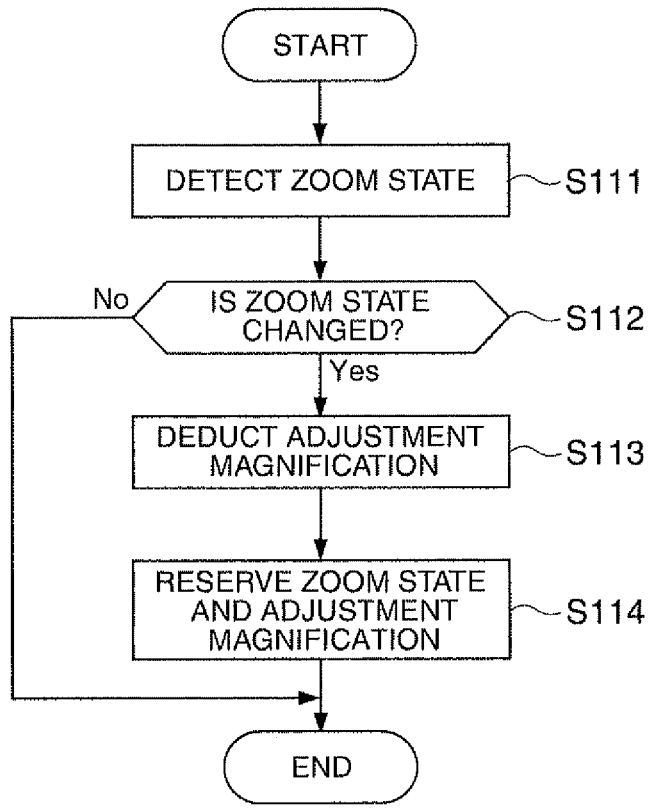
FIG. 6 is a flowchart illustrating the operation of the projector according to a second embodiment.

FIG. 6 is a flowchart illustrating the operation of the projector 1 of the embodiment. The projector 1 repeats the operation at a predetermined time interval according to the flow.

As shown in FIG. 6, in step S111, the control section 20 gives an instruction to the zoom state detecting section 27 and to detect the zoom state of the projecting lens 13.

In step S112, the control section 20 determines whether the zoom state is changed or not based on the detection result of the zoom state detecting section 27. Furthermore, as described below, the detection result (the zoom state) of the zoom state detecting section 27 is maintained in the RAM 20b and the control section 20 compares the detection result of this cycle and the detection result that is reserved so that the presence of the change can be determined. Thus, in a case where the zoom state is changed, it moves to step S113, and in a case where the zoom state is not changed, the flow is terminated.

In a case where the zoom state is changed and the flow moves to step S113, the control section 20 derives the adjustment magnification of the menu image Pm based on the new zoom state.

In step S114, the control section 20 reserves the zoom state that is detected at step S111 and the adjustment magnification that is derived at step S113 in the RAM 20b and the flow is terminated.

As described above, in the RAM 20b of the control section 20 according to the embodiment, the adjustment magnification of the menu image Pm is reserved and the adjustment magnification is updated when the zoom state is changed.

Figure 7:
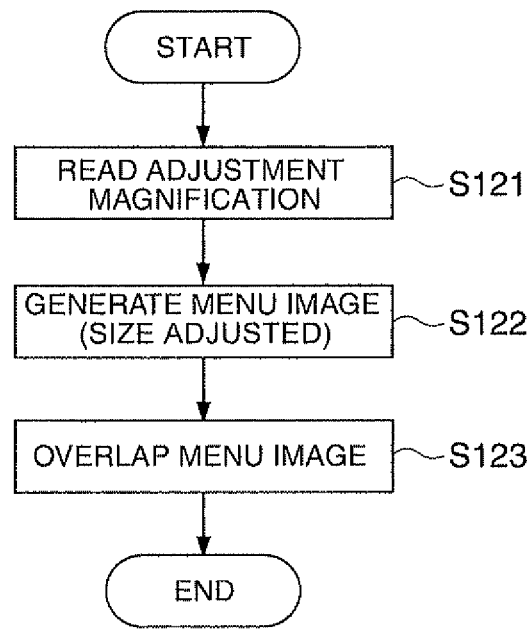
FIG. 7 is a flowchart illustrating the operation of the projector in a case where a menu key is operated according to the second embodiment.

FIG. 7 is a flowchart illustrating the operation of the projector 1 in a case where a menu key is operated. When the user operates the menu key of the input operating section 22, the control section 20 of the projector 1 operates according to the flow.

As shown in FIG. 7, in step S121, the control section 20 reads the adjustment magnification that is reserved in the RAM 20b. Thus, in step S122, the control section 20 outputs the adjustment magnification that was read to the OSD processing section 25 and instructs the generation of the menu image Pm to the OSD processing section 25. After the OSD processing section 25 generates the menu image Pm of M×N size according to the instruction, the size adjustment process is performed at the size adjusting section 25a according to the adjustment magnification that is input from the control section 20.

In step S123, the control section 20 gives an instruction to the OSD processing section 25 to overlap the menu image Pm in which the size adjustment is already performed, to the input image Pi and finishes the flow. As a result, the synthesized image, in other words, the input image Pi on which the menu image Pm is in an overlapped state is displayed on the projection surface S. Thus, the menu image Pm is displayed at a constant display size regardless of the zoom state of the projecting lens 13.

As described above, according to the projector 1 of the embodiment, effects may be obtained in the same manner as that of first embodiment.

Furthermore, according to the projector 1 of the embodiment, since the zoom state detecting section 27 always monitors the zoom state of the projecting lens 13 and, since the adjustment magnification is derived when the zoom state is changed the control section 20 does not need to derive the adjustment magnification when the menu key is operated. Thus, the load of the control section 20 may be decreased when the menu key is operated and the time between when the menu key is operated to when the menu image Pm is displayed may be shortened.

In the embodiment, the adjustment magnification is derived when the zoom state is changed, however in a case where the state that the zoom state is not changed is continued for a predetermined time after the zoom state is changed, the adjustment magnification may be derived. In this case, during the adjustment of the zoom state, the load that is hung on the control section 20 can be decreased since the process in which the adjustment magnification is derived is not performed.

Third Embodiment

Hereinafter, the projector of the third embodiment will be described with reference to the drawings.

The projector 1 of the embodiment always monitors the zoom state of the projecting lens 13 in the same manner as the second embodiment and in a case where the zoom state is changed, the projector 1 derives the adjustment magnification so that the display size of the menu image Pm is set to be constant. Further, the projector 1 of the embodiment instantly performs again the generation of the menu image Pm and updates the menu image Pm in a case where the menu image Pm is overlapped when the zoom state is changed. Configurations and operation other than the above description are the same as in the first embodiment.

Figure 8:
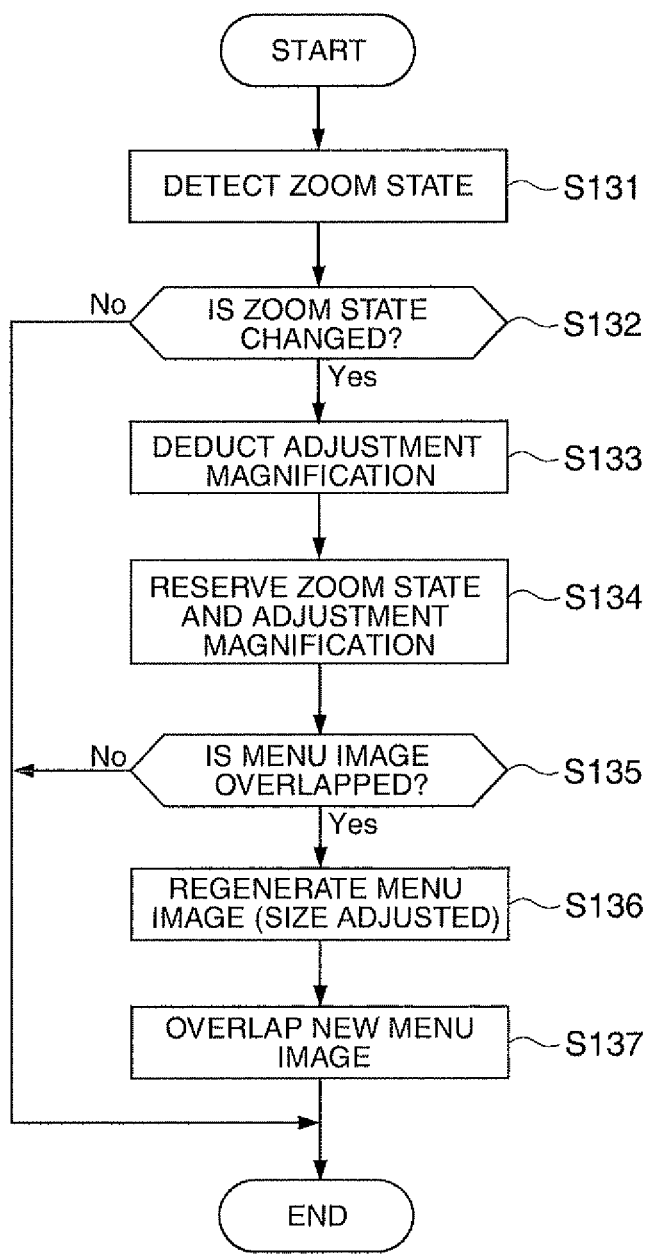
FIG. 8 is a flowchart illustrating the operation of the projector according to a third embodiment.

FIG. 8 is a flowchart illustrating the operation of the projector 1 of the embodiment. The projector 1 repeats the operation at a predetermined time interval according to the flow.

As shown in FIG. 8, in step S131, the control section 20 gives an instruction to the zoom state detecting section 27 to detect the zoom state of the projecting lens 13.

In step S132, the control section 20 determines whether the zoom state is changed or not based on the detection result of the zoom state detecting section 27 in the same manner as the second embodiment. Thus, in a case where the zoom state is changed, it moves to step S133, and in a case where the zoom state is not changed, the flow is terminated.

In a case where the zoom state is changed and the flow moves to step S133, the control section 20 derives the adjustment magnification based on the new zoom state.

In step S134, the control section 20 reserves the zoom state that is detected at step S131 and the adjustment magnification that is derived at step S133 in the RAM 20b.

In step S135, the control section 20 determines whether the menu image Pm is overlapped or not. Thus, in a case where the menu image Pm is overlapped, it moves to step S136 and in a case where the menu image Pm is not overlapped, the flow is terminated.

In a case where it moves to step S136, the control section 20 outputs the adjustment magnification that is derived at step S133 to the OSD processing section 25 and instructs a regeneration of the menu image Pm to the OSD processing section 25. The OSD processing section 25 regenerates the menu image Pm according to the instruction and the size adjustment process is performed at the size adjusting section 25a according to the adjustment magnification that is input from the control section 20.

In step S137, the control section 20 gives an instruction to the OSD processing section 25 to overlap the menu image Pm having a new size instead of the menu image Pm that was overlapped until then to the input image Pi. In other words, the size of the menu image Pm is updated and the flow is terminated. As a result, the display size of the input image Pi is changed according to the change of the zoom state, while the display size of the menu image Pm is always constant. In other words, in a case where the menu image Pm is overlapped, even if the zoom state is changed, the display size of the menu image Pm is maintained constantly.

As described above, according to the projector 1 of the embodiment, the same effects as in the first embodiment and second embodiment can be obtained.

Furthermore, according to the projector 1 of the embodiment, when the adjustment of the zoom state is performed, the menu image Pm of the new size is rapidly regenerated if the menu image Pm is in the overlapped state. Thus, even if the menu image Pm is in the overlapped state, the display size of the menu image Pm may be maintained constantly and the zoom state can be adjusted.

Furthermore, in the embodiments (the first to the third embodiments), the input image Pi corresponds to the main image and the menu image Pm corresponds to the OSD image. Furthermore, the zoom device 13a corresponds to the zoom adjustment section.

MODIFICATIONS

The above-described embodiments may be modified as described below.

In the above-described embodiments, the menu image Pm is described as an example of the OSD image, however the OSD image that is to be the object of the size adjustment is not limited to the menu image Pm and may apply to various OSD images. For example, the OSD image that is for informing the generation of errors (abnormal state) may be applied and in a case where the input source is a selectable configuration, the OSD image that is for informing the title of the input source that is selected may also be applied.

In the above-described embodiments, the OSD image (the menu image Pm) is configured including letters or the like in rectangular shaped figures (see FIGS. 3A to 4B), however the configuration of the OSD image is not limited to this. For example, the OSD image may be configured of only letters or symbols. In this case, the font size of the letters or the like may be adjusted according to the zoom state.

In above-described embodiments, the OSD processing section 25 adjusts the size at the size adjusting section 25a after the OSD image of a predetermined size is generated, however the invention is not limited to the embodiments. For example, the OSD image may be generated in a size that is designated by the control section 20. Furthermore, the OSD images of a plurality of sizes are prepared beforehand or the OSD images are generated in a plurality of sizes, and the optimum size of these, in other words, the size that has the minimum change of the display size may be selected according to the zoom state. Furthermore, in a case where the size of the OSD image is changed stepwise, the display size of the OSD image cannot be maintained precisely, it can suppress the display size of the OSD image from becoming too large or too small.

In the above-described embodiments, the size is changed (enlarged) from one time to two times as the reference of the size of the OSD image (the menu image Pm) in the wide end according to the zoom state, however the invention is not limited to the embodiments. For example, the size may be changed (reduced) from one time to ½ time as the reference of the size in the tele end according to the zoom state and the size may be reduced in the wide side and enlarged in the tele side as the reference of the size in intermediate state between the wide end and the tele end.

In the above-described embodiments, the case where the display size in the wide end is two times that in the tele end has been described, however the magnification of the display size is not limited to being two times.

In the above-described embodiments, in a case where the zoom state is the wide end, the menu image Pm is formed in an M×N size and in a case where the zoom state is the tele end, the menu image Pm is formed in an 2M×2N size. In other words, in the above-described embodiments, the size of the formed menu image Pm is determined according to the zoom state of the projecting lens 13, however the size of the menu image Pm may be designated by the user. In this case, after the user designates the size of the menu image Pm, the control for maintaining the display size constantly may be performed.

In the above-described embodiments, the mode (the size fixing mode) in which the display size of the OSD image is maintained constantly regardless of the zoom state and the mode (the normal mode) in which the display size of the OSD image coupled with the change of the zoom state is also changed may be selected according to the preference of the user.

In the above-described embodiments, the control section 20 derives the adjustment magnification and the OSD processing section 25 (the size adjusting section 25a) adjusts the size of the menu image Pm based on the adjustment magnification, however the invention is not limited to the embodiment. For example, the control section 20 may derive directly the size of the menu image Pm or derive the difference from the present size.

In the above-described embodiments, the OSD image is overlapped on the image (the input image Pi) based on the image information that is input from an exterior image output apparatus or the like, however in a case where the projector 1 includes an image regeneration section that can regenerate the image information that is stored in the recording medium such as a DVD (Digital Versatile Disc) or Blu-ray Disc (registered trade mark), the OSD image may be overlapped on the image (the regeneration image) based on the image information that is regenerated by the image regeneration section.

In the above-described embodiments, the three plate type projector 1 that uses three liquid crystal light bulbs 12 as the light modulation apparatus has been described, however the invention is not limited to the embodiment. For example, an embodiment in which the image is formed by one liquid crystal light bulb that includes a sub pixel capable of transmitting R light, a light and B light in each of pixels are transparent may be performed respectively.

In the above-described embodiments, the transparent type liquid crystal light bulbs 12 is used as the light modulation apparatus, however a reflector type light modulation apparatus such as a reflector type liquid crystal light bulb may be used. Furthermore, the projection direction of the incident light is controlled as the pixel for each micro mirror, however a micro mirror array device or the like that modulates the light that is output from the light source may be used.

In the above-described embodiments, the light source 11 is configured by the discharge type light source lamp 11a, however a solid-state light source such as a LED (Light Emitting Diode) or other light source may be applied.

What is claimed is:

1. A projector comprising:
    an OSD processing section configured to generate a synthesized image formed by synthesizing an OSD image on a main image;
    an image projecting section configured to project the synthesized image;
    a zoom adjusting section configured to adjust a zoom state of the image projecting section; and
    a zoom state detecting section configured to detect the zoom state that is adjusted by the zoom adjusting section,
    wherein the OSD processing section adjusts a size of the OSD image with respect to the main image based on the detection result of the zoom state detecting section, and
    the OSD processing section enlarges the size of the OSD image with respect to the main image in a case where the zoom state is changed from a wide side to a tele side, and reduces the size of the OSD image with respect to the main image in a case where the zoom state is changed from a tele side to a wide side.

2. The projector according to claim 1, wherein the OSD processing section adjusts the size of the OSD image with respect to the main image so that the projected OSD image is displayed constantly regardless of the zoom state.

3. The projector according to claim 1, wherein
    the zoom state detecting section detects the zoom state at a predetermined time interval, and
    the OSD processing section adjusts a size of the OSD image based on the zoom state while the OSD image is synthesized on the main image.

4. A method of controlling a projector including an OSD processing section configured to generate a synthesized image formed by synthesizing an OSD image on a main image, an image projecting section configured to project and displays the synthesized image, and a zoom adjusting section configured to adjust a zoom state of the image projecting section, the method comprising:
    detecting a zoom state that is adjusted by the zoom adjusting section, and
    adjusting a size of the OSD image with respect to the main image based on the detection result in the detecting of a zoom state,
    wherein in the adjusting of the size, the size of the OSD image with respect to the main image is enlarged in a case where the zoom state is changed from a wide side to a tele side, and the size of the OSD image with respect to the main image is reduced in a case where the zoom state is changed from a tele side to a wide side.

5. The method according to claim 4, wherein in the adjusting of a size, the size of the OSD image with respect to main image is adjusted so that the projected OSD image is displayed constantly regardless of the zoom state.

6. The method according to claim 4, wherein
    the detecting step detects the zoom state at a predetermined time interval, and
    the adjusting step adjusts the size of the OSD image based on the zoom state while the OSD image is synthesized on the main image.

* * * * *